United States Patent [19]

Dietz et al.

[11] Patent Number: 4,635,994
[45] Date of Patent: Jan. 13, 1987

[54] SUN VISOR, PARTICULARLY FOR AUTOMOTIVE VEHICLES, WITH REVERSIBLE MIRROR

[75] Inventors: Günter Dietz, Wuppertal; Manfred Nowak, Solingen, both of Fed. Rep. of Germany

[73] Assignee: Gebr. Happich GmbH, Fed. Rep. of Germany

[21] Appl. No.: 696,354

[22] Filed: Jan. 30, 1985

[30] Foreign Application Priority Data

Feb. 10, 1984 [DE] Fed. Rep. of Germany ..... 34047352

[51] Int. Cl.⁴ .............................................. B60J 3/02
[52] U.S. Cl. ..................... 296/97 H; 16/361
[58] Field of Search ............. 296/97 H, 97 R; 16/361, 16/360; 362/135, 142, 144; 308/3 R, 3.6

[56] References Cited

U.S. PATENT DOCUMENTS

| 3,024,502 | 3/1962 | Howard | 308/3 R |
| 4,068,930 | 1/1978 | Marcus | 296/97 R |
| 4,521,051 | 6/1985 | Cody et al. | 296/97 H |
| 4,541,663 | 9/1985 | Schwartz et al. | 296/97 H |

Primary Examiner—Robert R. Song
Attorney, Agent, or Firm—Ostrolenk, Faber, Gerb & Soffen

[57] ABSTRACT

A sun visor for automotive vehicles including a mirror supported in a housing which is in a recess defined in a surface of the visor body. The mirror is reversible for exposing its reflecting or non-reflecting sides. One edge of the mirror is swingably supported in bearing pedestals which are slidable in lateral guide slots defined in the housing in the recess, whereby as the mirror is reversed in position, the pivot axis thereof slides along the guide slots.

8 Claims, 6 Drawing Figures

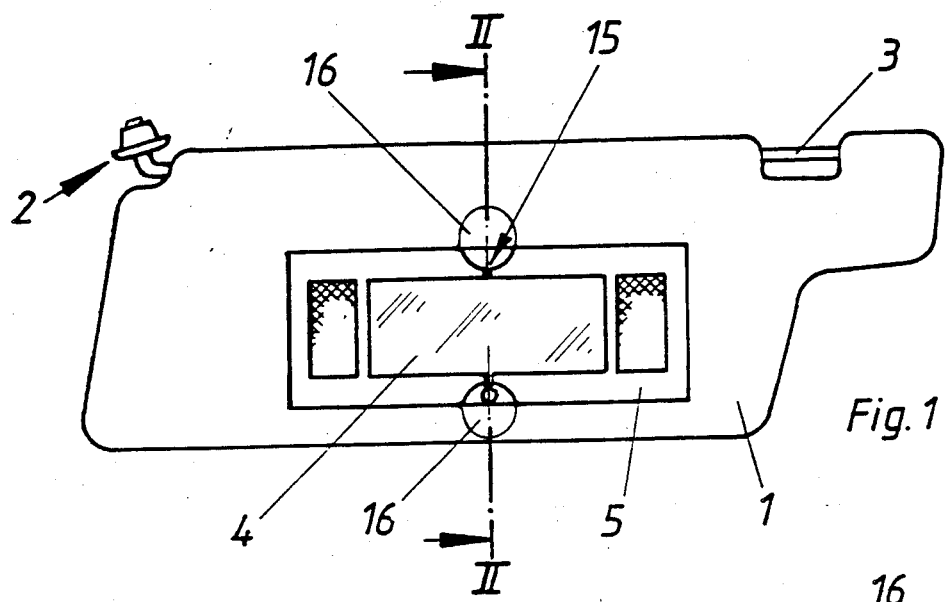
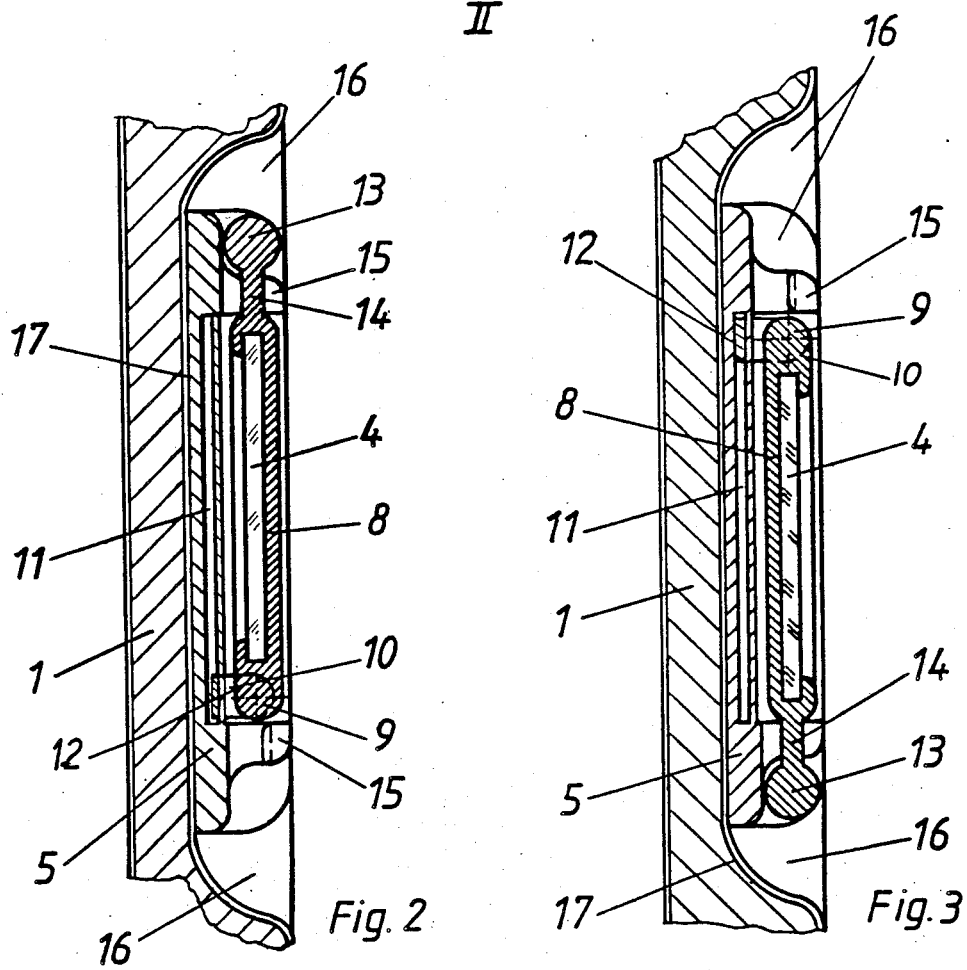
Fig. 1
Fig. 2
Fig. 3

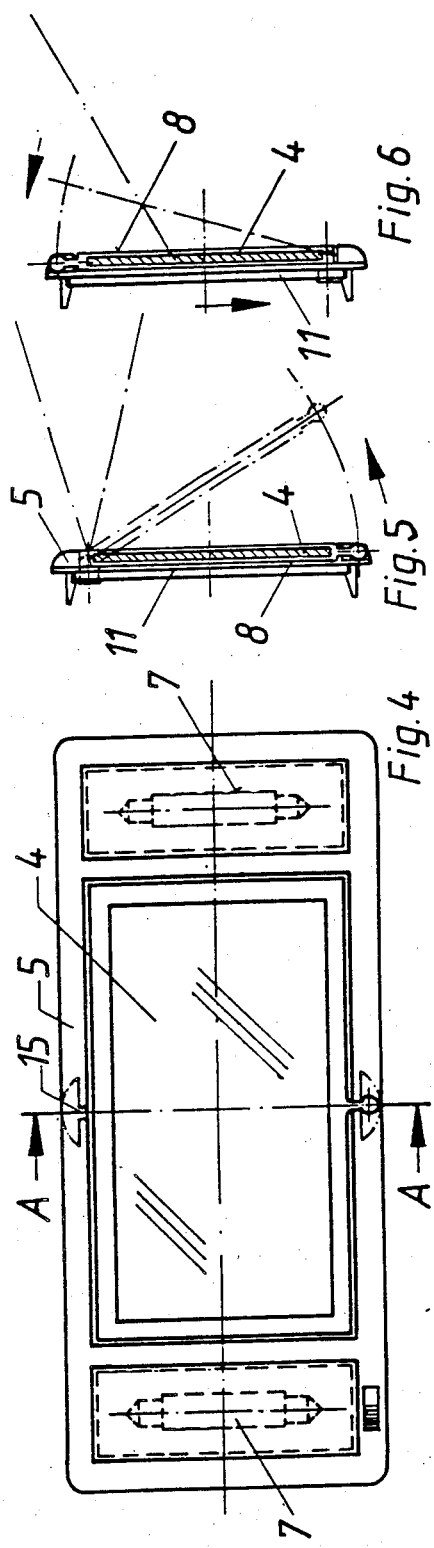

SUN VISOR, PARTICULARLY FOR AUTOMOTIVE VEHICLES, WITH REVERSIBLE MIRROR

BACKGROUND OF THE INVENTION

1. Field of the Invention

The present invention relates to a sun visor, particularly for automotive vehicles, and having a flipover mirror, or mirror which can be reversed so that its reflective side can be selectively covered or exposed.

2. Description of the Prior Art

Vehicle sun visors are to an increasing extent provided with mirrors. For various reasons, such as avoiding the danger of driver or passenger dazzling, they are provided with mirror covers. Mirror covers generally are flaps, which are pivoted to the sun-visor body above or below the mirror. Such flaps must be separately manufactured and then fastened to the sun visor. This increases the cost of manufacture of the sun visor, particularly as the sun visors and their flaps must also include means which make it possible to hold the flaps in their closed or opened positions.

SUMMARY OF THE INVENTION

The object of the present invention is to create a vehicle sun visor which has a coverable or flipover mirror and in which no elements separate from the mirror need be brought over the mirror in order to cover it, enabling the sun visor to be manufactured in a simpler and more economical fashion.

In accordance with the invention, the mirror is arranged on the sun visor so that it can be reversed. By merely turning the mirror over, its reflective side can be brought into a covered or a viewable position, enabling a flap or similar covering means to be dispensed with.

The invention can be reduced to practice in various ways. In the case of a mirror consisting of a suitable metallic or metallized material, it is possible to mount the mirror on the sun visor by a magnet attached to the visor. It is furthermore possible to provide the sun visor with spring clamps, or the like, which grip around the mirror at two opposite edges and thus hold the mirror on the sun visor in such a way that it can be repeatedly detached.

However, the mirror according to the invention is preferably not connected in a removable manner to the sun visor. The mirror is instead arranged swingably around one edge, and that edge is displaceable by translation along the sun visor. It is advantageous for the mirror to have a hinge axis on one edge which is received in a displaceable manner in lateral guides arranged on the sun visor. Alternatively, the mirror may be provided on one edge with hinge axis pins, the ends of which axis pins engage into bearing pedestals which themselves are received for translation in slot guides along the sun visor. To turn the mirror over, with its reflective side movable between its viewable and covered positions, it can be grasped at the edge opposite the hinge axis, the grasped edge can be swung out, the hinged edge can be shifted along the guides, and the grasped edge can then be swung back again. This enables the mirror side which was formerly toward the outside to rest against the sun visor and thus be covered, and vice verra. In order to counteract canting upon the displacement of the mirror, it is advantageous for the bearing pedestals to be rigidly connected to each other by a brace.

In the preferred embodiment of the invention, the mirror is developed integrally with a rear cover which also grips the mirror around its edges. In this way, the esthetic requirement for a vehicle sun visor can be taken into account, since both the color and the surface structure of the cover can be adapted to the corresponding appearance of the specific sun visor.

The rear cover is preferably provided with the hinge axis. This enables developing the hinge axis as a pin which is to be fastened to the cover or, on the other hand, enables developing the hinge axis integral with and of the same materials as the cover. The latter method is particularly suitable when the cover is a plastic injection molding, which is preferable for such a cover.

In a further development of the invention, the mirror can be arranged reversibly on a box-shaped housing which is fastened to the sun visor and the housing is provided with guide slots. This makes it possible to assemble a structural unit which includes the displacement mechanism and to apply it to a finished sun visor.

Another preferred embodiment of the invention resides in the mirror, preferably together with the housing, being swingable within a recess in the sun visor in such a manner that the mirror does not project beyond the corresponding outer surface of the sun visor, either in its covered position or in its viewable position. In this way, a pleasing appearance of the sun visor is obtained and safety interests are also taken into account because of the absence of protruding corners and edges.

As a further development, the housing may have at least one chamber adjacent an edge of the mirror containing an electric light. This result in the possibility of using the mirror in the dark.

Other objects and features of the invention are described below with reference to the accompanying drawings.

BRIEF DESCRIPTION OF THE DRAWINGS

FIG. 1 shows a sun visor with a reversible mirror arranged on it;

FIG. 2 is a section along the line II—II of FIG. 1 with the mirror shown covered;

FIG. 3 is a section along the line II—II of FIG. 1 with the mirror arranged so that it is viewable;

FIG. 4 is a detail showing the mirror and the mirror housing; and

FIGS. 5 and 6 are each a section taken along the line A-B of FIG. 4, with different arrangements of the mirror.

DESCRIPTION OF THE PREFERRED EMBODIMENT

A sun visor consists essentially of a generally flat sun-visor body 1 having a swivel mount 2 arranged in the vicinity of one end of its upper longitudinal edge, an outer support pin 3 which is arranged on the other end of the same longitudinal edge and which can be detachably engaged in an outer support housing (not shown) on the vehicle body, and a mirror 4 arranged on the sun-visor body. In the embodiment shown, the mirror 4 is seated within a housing 5 in which chambers 6 for electric bulbs 7 are developed on both sides of the mirror, as shown in FIG. 4.

As can be noted from FIGS. 2, 3 and 5, 6, the mirror 4 is developed integrally with a rear cover 8 which also surrounds its edges, and the mirror and cover are mounted together reversibly in the housing 5. The cover 8 has oppositely projecting pins 9, which are located at an edge region of the mirror and which together form a hinge axis. The pins are received in bearing pedestals 10 which, in their turn, are seated displaceably in guide slots 11 in the housing 5. The bearing pedestals 10 are preferably connected to each other by a brace 12. Like the housing 5, the cover 8 preferably is a plastic injection molding. It has a projection 13 formed on it in the central region of the edge opposite the hinge axis, which serves as a handle. The projection 13 has a narrowed neck portion 14, which is received in an undercut housing slot 15 which is provided on opposite inner housing-edge regions. The slot continues in a grip trough 16 which is recessed in the sun-visor body 1, since the housing 5 is preferably arranged in a trough-shaped depression 17 in the sun-visor body 1.

To swing the mirror 4 out of it covered position (see, for instance, FIG. 2) into its viewable position (see, for instance, FIG. 3), it is merely necessary to pull the projection 13 with one's finger out of the corresponding housing slot 15, and to swing it over a total of 180°, while at the same time pushing the hinge axis within the slotted guide in the direction toward the opposite end. This course of motion is shown in FIGS. 5 and 6.

Optionally, the visor may be provided with springs to aid in the motion of the mirror, although a particular spring arrangement is not part of this invention.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A sun visor for automotive vehicles comprising a sun-visor body having a surface for facing into the vehicle; a housing and mirror assembly including a housing for a mirror which is separate from the sun-visor body but is affixed to such body at the surface thereof, and a flipover mirror having a reflective front face and which is supported by the housing; the mirror having a hinge axis generally at an edge thereof for swinging of the mirror around the hinge axis between a position in which the mirror is covered and a position in which the mirror is exposed; lateral guides being defined on a major surface of the housing and extending along such surface; bearing pedestals at least partially disposed in the lateral guides; hinge means for coupling the mirror to the bearing pedestals, the hinge means being effective for maintaining the orientation of the hinge axis relatively constant as the hinge axis travels along the lateral guides; the hinge axis being defined in the bearing pedestals and the hinge axis being displaceably received in and movable along the lateral guides, whereby the housing and mirror assembly may be preassembled without strict dimensioning relative to the sun-visor body and later affixed to the sun-visor body and the mirror is prevented from canting relative to the lateral guides.

2. The sun visor of claim 1, wherein the mirror carries hinge pins thereon which project from the mirror and define the hinge axis; the hinge pins projecting into the bearing pedestals.

3. The sun visor of claim 1, further comprising a cover for the rear of the mirror and the mirror cover also surrounding the peripheral edges of the mirror.

4. The sun visor of claim 3, wherein the hinge axis is defined on the cover for the mirror.

5. The sun visor of claim 1, wherein the housing includes a chamber arranged at an edge of the mirror with an electric light source supported in the chamber for projecting light forwardly of the surface of the visor.

6. The sun visor of claim 1, further comprising a recess defined in the visor body at the surface thereof and the mirror being disposed within the recess such that it does not protrude beyond the surface of the visor in either of its positions.

7. The sun visor of claim 1, further comprising a source of electric light supported on the visor body generally at an edge of the mirror for providing illumination outwardly of the surface of the visor body.

8. The sun-visor of claim 1, further comprising a brace rigidly connecting together the bearing pedestals, whereby canting of the mirror relative to the guide slots is reduced.

* * * * *